April 26, 1932. W. J. CANDLISH ET AL 1,855,280
FILTERING SYSTEM AND FILTER TANK
Filed Sept. 16, 1929  2 Sheets-Sheet 2
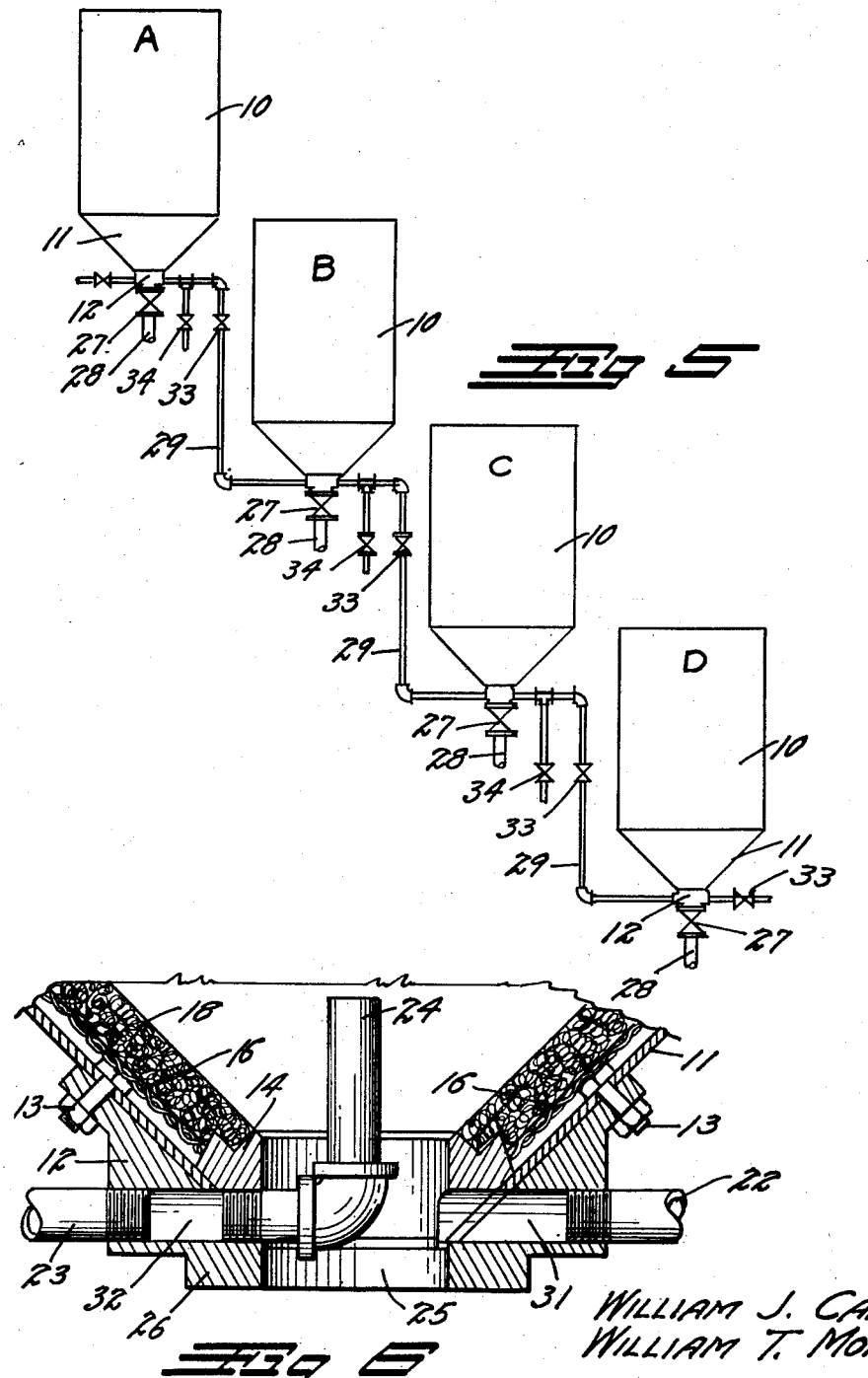

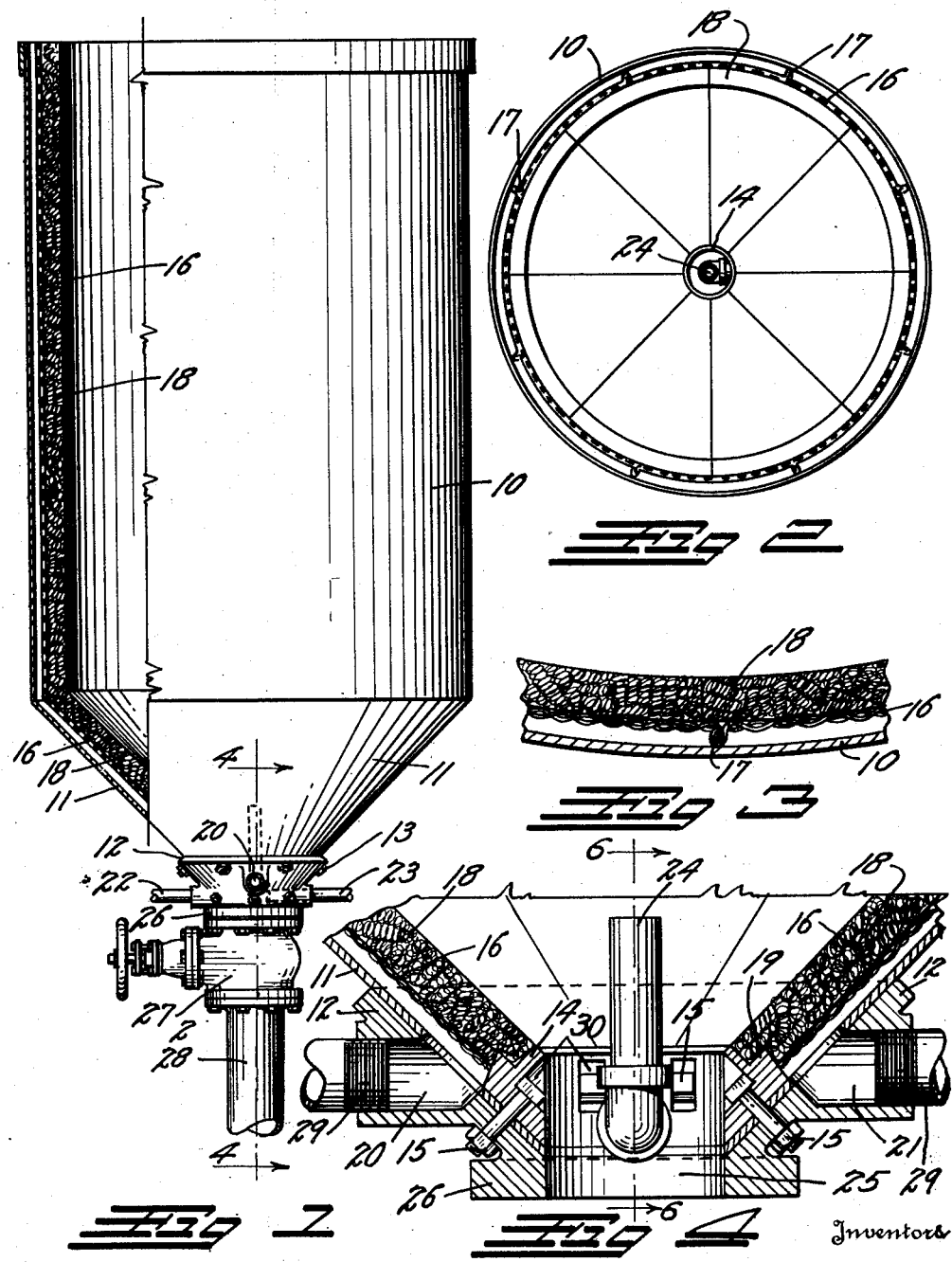

Patented Apr. 26, 1932

1,855,280

UNITED STATES PATENT OFFICE

WILLIAM J. CANDLISH AND WILLIAM T. MORGAN, OF DENVER, COLORADO, ASSIGNORS TO INTERSTATE CO-PARTNERSHIP ASSOCIATION, OF DENVER, COLORADO, A COMMON LAW TRUST

FILTERING SYSTEM AND FILTER TANK

Application filed September 16, 1929. Serial No. 392,832.

This invention relates to a filtering tank which while particularly designed for filtering ore pulp to obtain soluble materials will find valuable use in any industry where it is desired to precipitate and filter large quantities of material.

The principal object of the invention is to provide a simple, compact, and efficient filtering tank which can be used for precipitating and filtering relatively large quantities of pulp solution; which will allow free passage for the filtrate; in which the solution can be agitated and heated; from which the residue can be quickly and easily discharged; and in which the filter medium will be thoroughly washed free from entrapped material by the incoming solution.

Another object is to so construct the filter tank that several may be used in series so that a selective precipitation process can be continuously carried out.

A further object is to so construct the tank that all supply and discharge lines for water, filtrate, steam, sludge, etc., will enter through a common fitting so that installation can be quickly effected without drilling and tapping holes in the tank.

Other objects and advantages reside in the detail construction of the invention which is designed for simplicity, economy, and efficiency. These will become more apparent from the following description.

In the following detailed description of the invention reference is had to the accompanying drawings which form a part hereof. Like numerals refer to like parts in all views of the drawings and throughout the description.

In the drawings:

Fig. 1 is a side elevation of a filter tank in which the invention is embodied. In this view a portion of the tank has been broken away to show the interior construction thereof.

Fig. 2 is a plan view of the tank of Fig. 1.

Fig. 3 is an enlarged fragmentary horizontal section through the tank wall.

Fig. 4 is an enlarged vertical section through the tank bottom taken on the line 4—4, Fig. 1.

Fig. 5 is a diagram illustrating a series of the improved filtering tank connected for selective precipitation.

Fig. 6 is an enlarged vertical section taken on the line 6—6, Fig. 4.

In the drawings a tank is illustrated at 10 having an open top and a hopper-shaped bottom 11. The hopper shaped bottom 11 terminates in a conical casting 12 which is bolted thereto by means of suitable bolts 13. Within the bottom 11 an internal ring 14 is positioned. The metal of the hopper-shaped bottom 11 is clamped between the ring 14 and the casting 12 by means of clamp bolts 15. The heads of the bolts 15 are positioned in pockets 30 in the ring 14.

Within the tank 10 a perforated lining 16 is placed which extends throughout the entire area of the tank and bottom 11. The lining 16 is provided with vertical ribs 17 by means of which it is spaced from the tank wall.

The lining 16 may be of any suitable material such as perforated sheet metal, etc. A very excellent material for this purpose has been found to be expanded metal lath, which is both perforated and corrugated. The lining is formed by interlocking strips of the metal lath, the interlocking portions being extended outwardly to form the ribs 17, as shown in Fig. 3. The lining 16 extends downwardly to contact with the internal ring 14 in the bottom of the tank.

The inner face of the lining 16 is covered with suitable filtering medium 18. This medium preferably consists of relatively thick sections of pressed mineral wool. The sections of the filter medium 18 also extend downwardly into contact with the internal ring 14. A shelf 19 is formed about the ring 14 against which the sections of the filtering medium 18 rest.

The casting 12 contains a series of passageways. Two relatively large oppositely placed solution passages 20 and 21 communicate through openings in the bottom 11 with the space between the lining 17 and the wall of the tank 10, a water passage 31, which communicates with an external water pipe 22, and a steam passage 32, extend through the casting 12, the bottom 11, and the ring 14. The steam passage 32 is supplied from a steam pipe 23 and supports an upwardly turned steam nozzle 24, on the interior of the tank.

The hollow centers of the ring 14 and casting 12 form a central sludge or precipitate discharge passage 25. The external orifice of the discharge passage 25 is surrounded by a peripheral flange 26 to which a suitable gate valve 27 is bolted. A discharge pipe 28 carries material from the gate valve 27.

In actual practice a series of the tanks 10 are employed, such as indicated at "A", "B", "C", and "D" in Fig. 5. The individual tanks in the series being interconnected by means of solution pipes 29 which extend between the passages 20 and 21 of the adjacent tanks. The solution pipes are controlled by means of suitable valves 33.

A discharge valve 34 is provided in each pipe 29 so that solution can be withdrawn at any point in the circuit. As illustrated, the solution flows from one tank to another by gravity. They can if desired be placed upon a common level with pumps for handling the solution.

In use, the pulp to be filtered is placed in the first tank "A" through the open top thereof. All the valves 33 and 34 are closed at this time. Suitable solvents are then introduced through either the open top or the water pipe 22. The soluble portions of the material will pass as solution through the filter medium 18 to the space between the tank walls and lining 17.

In some ore treating processes it is preferable to heat and agitate the material in order to obtain a complete dissolution. This may be done by forcing a jet of steam through the steam pipe 23 upwardly into the mass. The steam will both agitate and heat the solution and sludge. The steam jet is positioned at the center of the tank and will cause a rising column of liquid at this point and a descending column along the walls thereof so that all portions of the solution will be brought into close contact with the filter medium.

If no further precipitation or filtering is desired the solution can be discharged through the discharge valve 34. If selective precipitation is to be practiced the first valve 33 is opened and the solution is drawn through the pipe 29 to the tank "B". In tank "B" it will flow through the filter medium 18 to the tank interior where suitable precipitating reagents may be added to obtain the first precipitate.

The second valve 33 is then opened and the solution is drawn off through the second pipe 29 to the tank "C" where the second precipitate is deposited. This process is continued until all of the desired precipitates have been thrown down. Water or steam or reagents can be added at any time during the process.

The sludge or solid matter from tank "A" is drawn off through the first discharge pipe 28 to the dump or for further treatment. The selected precipitate from the remaining tanks "B", "C", "D", etc. is similarly drawn off through their individual discharge pipes 28 and valves 27. As many tanks are used as required for the number of selected precipitates to be recovered. The final filtrate is discharged through the valve 27 of the last tank 10.

It will be noted that in the intermediate tanks a filter medium is constantly subjected to alternate directions of flow, that is, the tank is filled through the filter medium and is emptied through the medium. This return flow constantly cleans the filter medium so that it will remain active indefinitely.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:—

1. A filtering system comprising: a series of outer containers; a porous inner container within each of said outer containers; a pair of solution passages in each of said outer containers communicating with the space between said inner and said outer containers; a conduit connecting a solution passage of one tank with a solution passage of an adjacent tank throughout the system; valves in said conduit, so that the filtered solution from one tank may be passed through the walls of and into the inner container of an adjacent tank and means for discharging solid material through the bottom of both containers.

2. A filtering system comprising: a series of outer containers; a porous inner container within each of said outer containers; a pair of solution passages in each of said outer containers communicating with the space between said inner and said outer containers; a conduit connecting a solution passage of one tank with a solution passage of an adjacent tank throughout the system; valves in said conduit, so that the solution from one tank may be passed through the walls of and into the inner container of an adjacent tank; and means for discharging the solution intermediate the tanks throughout the system and means for discharging solid material from said inner container through the bottom of said outer container.

3. A filtering system comprising: a series of outer containers; a porous inner container within each of said outer containers; a pair of solution passages in each of said outer containers communicating with the space between said inner and said outer containers;

a conduit connecting a solution passage of one tank with a solution passage of an adjacent tank throughout the system; valves in said conduit, so that the solution from one tank may be passed through the walls of and into the inner container of an adjacent tank; and means for discharging the filtered material from each inner container through the outer container thereof.

In testimony whereof, we affix our signatures.

WILLIAM J. CANDLISH.
WILLIAM T. MORGAN.